United States Patent [19]

McDonough

[11] 3,818,423

[45] June 18, 1974

[54] INTEGRATED CIRCUIT TERMINAL AND METHOD

[75] Inventor: Cletus G. McDonough, Elmhurst, Ill.

[73] Assignee: Molex, Incorporated, Downers Grove, Ill.

[22] Filed: Feb. 25, 1972

[21] Appl. No.: 229,471

Related U.S. Application Data

[63] Continuation-in-part of Ser. No. 880,574, Nov. 28, 1969, Pat. No. 3,673,551.

[52] U.S. Cl. .......................... 339/258 P, 339/275 B

[51] Int. Cl. .......................... H01r 13/12

[58] Field of Search ......... 339/258, 259, 217, 275 B

[56] References Cited

UNITED STATES PATENTS

| | | | |
|---|---|---|---|
| 2,525,210 | 10/1950 | Del Camp | 339/258 P |
| 3,076,172 | 1/1963 | Carr et al. | 339/258 F |
| 3,369,212 | 2/1968 | Coldren et al. | 339/32 R |
| 3,659,243 | 4/1972 | Glunty | 339/258 R |

FOREIGN PATENTS OR APPLICATIONS

| | | | |
|---|---|---|---|
| 639,597 | 3/1964 | Belgium | 339/258 R |

*Primary Examiner*—Joseph H. McGlynn
*Attorney, Agent, or Firm*—Olson, Trexler, Walters, Bushnell & Fosse, Ltd.

[57] ABSTRACT

A sheet metal terminal is formed of spring metal such as brass with a plurality of terminals attached to one another in chain fashion by a carrier strip of scrap of the metal blank from which the terminals are formed. Each terminal is open at an end and has a mounting lug or tongue at its opposite end. The lugs or tongues of a plurality of interconnected terminals are inserted through aligned apertures in a pair of parallel rows in a printed circuit board, following which the terminals are flow soldered to the printed circuit board, and the scrap interconnection is cut off. A pair of rows of terminals thus is provided into which the terminals of a "crab pack" integrated circuit may be plugged.

7 Claims, 15 Drawing Figures

INTEGRATED CIRCUIT TERMINAL AND METHOD

CROSS-REFERENCE TO RELATED APPLICATION

This application is a continuation-in-part of my copending U.S. Pat. application Ser. No. 880,574, filed Nov. 28, 1969, now U.S. Pat. No. 3,673,551.

BACKGROUND OF THE INVENTION

Printed circuit boards are widely used in diverse electrical industries. Such printed circuit boards commonly are provided with holes through which terminal leads of electrical components are inserted, and then soldered into place. Removal of parts is difficult since localized desoldering is required, and since many components, particularly including solid state devices, are readily damaged by heat. Nevertheless, certain parts must from time-to-time be replaced. The question becomes particularly critical when integrated circuits are connected, since, as is known, a very large number of components may be provided in a single integrated circuit, and the intent is that malfunction of any one part is corrected simply by replacing the entire integrated circuit. As will be appreciated, a typical integrated circuit may have a dozen or more leads, and the problems of desoldering each terminal, particularly bearing in mind that the terminals cannot be withdrawn one-by-one, become insurmountable.

Accordingly, it is desirable to provide some sort of a plug-in terminal for receipt of the terminals of an integrated circuit. However, one of the great advantages of integrated circuits is a savings in cost of materials. If such saving is largely eliminated by the cost of added terminals, then one of the primary reasons for using integrated circuits is lost.

A more specific problem arises with certain types of printed circuit boards. In relatively high quality boards the printed circuits are located quite precisely, and the holes therein are likewise located precisely, often by drilling the holes. However, in inexpensive printed circuit boards of certain types the printed circuitry may not be precisely located. Furthermore, the holes are often not precisely located, commonly being simply stamped or punched in the board. As a consequence, a hole may not be well centered in the corresponding printed circuitry, but may be off to one side, thereby leaving insufficient printed circuit wiring area for a proper solder connection to be made. This problem in some aspects of printed circuit boards is readily corrected simply by enlarging the dimensions of the printed circuitry. However, in the case of integrated circuits the terminals are mounted quite close together, being on the order of 0.100 inches center-to-center, and this precludes the possibility of enlarging the areas in which the holes are located.

Efforts have been made heretofore to correct this problem by staggering the holes, every other one being offset, whereby the actual spacing between each pair of holes is increased significantly, even though the linear spacing remains the same. However, this has heretofore required a special order integrated circuit which has often not been available, and which has been considerably more expensive than a standard integrated circuit, even when it is available.

The foregoing problems are solved through the provision of a sheet metal terminal made of resilient metal such as brass. The terminal has a tongue or the like which can be inserted through a hole in a printed circuit board and soldered in place. A plurality of such terminals are provided in two parallel lines, whereby a "crab pack" integrated circuit can be plugged directly into the terminals. The terminals are made in chain fashion in that a plurality of terminals are interconnected by a scrap piece or carrier strip so that a plurality of terminals is readily inserted in a printed circuit board in a single operation. The terminals thereupon are soldered in place, and the interconnecting scrap is severed from the terminals. In accordance with the invention, the tongues of successive terminals may be alternately offset, whereby to plug into offset holes in the printed circuit board, yet leaving the terminals aligned in a straight line for receipt of the integrated circuit terminals. A very high percentage of the initial metal blank is used so that the amount of scrap is quite small and efficient use is made of the initial material, thereby maintaining a low cost.

In view of the foregoing, it is an object of the present invention to provide an inexpensive terminal for soldering in place in a printed circuit board for detachable receipt of a complementary terminal of an integrated circuit.

More particularly, it is an object of the present invention to provide a plurality of such terminals interconnected by a scrap piece or carrier strip whereby such plurality of terminals can be simultaneously assembled with a printed circuit board.

In a specific form of the invention it is an object to provide a plurality of similar terminals with mounting tongues alternately offset in opposite directions for receipt in offset holes in a printed circuit board, but with the integrated circuit terminal receiving portions thereof in straight line array.

DETAILED DESCRIPTION

Figures 1, 2, 3, 4, 5, 6:
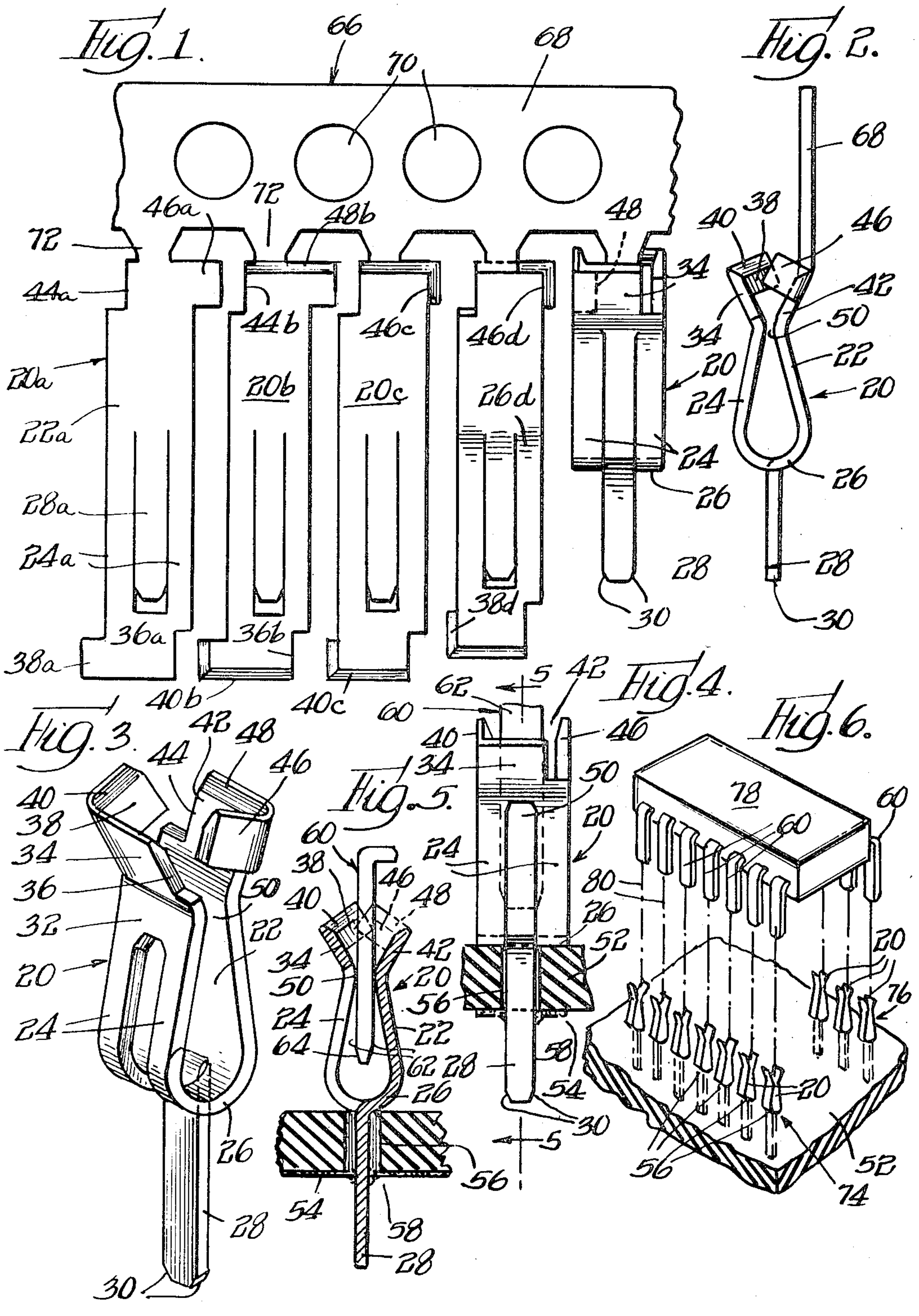
FIG. 1 is a plan view showing the successive steps in the formation of an integrated circuit terminal in accordance with the present invention.
FIG. 2 is a side view taken from the right end of FIG. 1.
FIG. 3 is a perspective view of an integrated circuit terminal in accordance with the present invention.
FIG. 4 is a front view of the terminal as installed in a printed circuit board with a terminal of an integrated circuit plugged thereinto.
FIG. 5 is a cross-sectional view taken substantially along the line 5—5 in FIG. 4.
FIG. 6 is a fragmentary exploded perspective view showing a plurality of integrated circuit terminals mounted in a printed circuit board with a "crab pack" integrated circuit about to be plugged thereinto.

Attention should first be directed to the right end of FIG. 1 and also FIGS. 2 and 3 for an understanding of one form of the terminal of the present invention. The terminal 20 is made of a suitable resilient sheet metal such as brass, phosphor bronze, or beryllium copper, and include a main body 22, and an opposed resilient structure that includes a pair of spaced apart legs 24 joined to the body by a bight 26. The body 22 is straight throughout most of its length, as are the legs 24, the bight 26 being a continuous arc joining the legs to the body. A tongue or mounting member 28, formed by striking from the material between the legs 24, extends straight down from the bight, and has the lower corners 30 thereof chamfered to aid in placing the tongue through a hole in the printed circuit board, as will be brought out hereinafter.

The upper ends of the legs 24 are joined together as may be seen at 32, and from this point there extends an outwardly and upwardly directed flange 34 notched at one side as indicated at 36, and having a right angularly disposed lateral flange portion 38 along the opposite longitudinal edge. The upper extremity of the flange 34 and the corresponding upper extremity of the flange 38 are both internally chamfered at 40.

Similarly, at the upper end of the body 26 there is a diagonally outwardly disposed flange 42 notched at one longitudinal edge as indicated at 44, and having a right angularly disposed lateral flange portion 46 on the opposite longitudinal edge. The upper edges of the flange 42 and of the right angle flange 46 are internally chamfered at 48.

As will be seen particularly in FIG. 2, the convergence of the body 22 and of the legs 24 produces a relatively narrow throat 50 at the upper ends thereof immediately below the subsequent divergence of the flanges 34 and 42. Also in FIG. 2 it will be observed that the two flange portions 38 and 46 at least partially overlap one another, and as will be seen with reference to FIGS. 1 and 3, these flanges lie in planes which are substantially parallel to one another.

Turning now to FIGS. 4 and 5, there will be seen a printed circuit board 52 of known construction including an insulating sheet or card having printed circuit wiring 54 on one face thereof, herein shown as the bottom face. The printed circuit board is provided with a hole 56 extending through the printed circuit board and also through a portion of the printed circuit wiring 54. The tongue 58 of the terminal 20 is readily inserted through the hole in the printed circuit board, particularly by virtue of the chamfered lower corners 30 of the tongue. Solder 58 then is applied to the under-face of the printed circuit board by the usual flow or wave soldering technique, whereby to solder the tongue 28 to the printed circuit wiring.

A male terminal 60 of an integrated circuit then can be plugged longitudinally into the terminal 20, which will be recognized as a female terminal. The male terminal 60 is of the blade or spade type having opposed flat faces 62 engageable with the confronting surfaces of the throat 50 of the terminal 20. As will be seen, the lower end of the integrated circuit terminal 60 has chamfered corners 64 to facilitate insertion in the female terminal 20.

Insertion also is facilitated by virtue of the divergence of the flanges 34 and 42, and by the chamfered upper edges 40 and 48 of the flanges 34, 38 and 42,46. There is thus formed a passageway converging from the upper open end of the terminal toward the throat 50. The terminal 60 is gripped by the surfaces of the terminal 20 adjacent the throat 50, and the terminal 60 further is positioned from side to side of the terminal 20 by the flange portions 38 and 46. The distance between the flange portions 38 and 46 is substantially greater than the corresponding transverse dimension of the male terminal 60, as will be seen particularly in FIG. 4, and this facilitates insertion of the male terminal in the female terminal.

Steps in the manufacture of the terminal may be visualized with a return in FIG. 1, wherein the sheet metal blank is indicated by the numeral 66. An edge of the sheet metal blank remains as a strip or ribbon 68 interconnecting the succession of terminals 20 in their incipient and final states. The strip 68 is provided with spaced apertures 70 for driving of the material in automatic machinery.

Some of the earliest stages of blanking are omitted from the left side of FIG. 1 as not being of critical consequence relative to the final product. At the first stage on the extreme left side of FIG. 1 what will eventually be a terminal is indicated by the numeral **20*a*, and by this time the final outline of the terminal has taken shape and the sides and end of the tongue 28 have been severed from the remainder of the material. At this stage, however, the entire terminal is still planar. At the left side of FIG. 1, the subparts of prospective terminal 20*a*** are identified by the numerals heretofore used with the addition of the suffix *a*, and the prospective terminal is still connected to the next prospective terminal on the left at the lower corner adjacent the prospective flange **38*a*. The reason for the notches 36 and 44 will be seen in connection with the corresponding areas 36*a* and 44*a* in providing clearance for severing from the adjacent flange portions 38*a* and 46*a* while positioning the tongue on 0.100 centers. This spacing is further maintained by placing the flanges 38*a* and 46*a* on opposite ends of the blanked terminal. The terminal blanks are connected to the carrier strip 68 by generally trapezoidal scrap pieces or tabs 72**.

Moving to the next adjacent prospective terminal **20*b*, the situation is generally the same as described in connection with 20*a*, except that the chamfered edges 40*b* and 48*b*** have now been provided.

Moving to the next area to the right, where the prospective terminal is identified at **20*c*, it will be seen that the flanges 40*c* and 46*c* have been turned out of the initial plane. Continuing to the next area to the right, wherein the prospective terminal is identified as 20*d***, it will be seen that the material has been impressed at a central area 26*d* corresponding to the ultimate bight, thereby somewhat foreshortening the length of the blanked material.

The next step to the right results in the final terminal 20, and as will be understood all steps are carried on in succession in generally conventional punched press machinery.

A plurality of finished terminals remain attached to one another in chain fashion by means of the carrier strip 68 and the scrap sections or tabs 72. Such plurality of terminals is handled as a unit, and the tongues thereof are inserted through a plurality of aligned holes 56 in the printed circuit board 52 (see FIG. 6), and all of the terminals are soldered in place as heretofore indicated. Subsequent to the soldering operation, all of the tabs are severed from the terminals in a shearing operation, whereby to leave the separate terminals 20 mounted on the printed circuit board in two parallel rows 74 and 76. Thus, the so-called "crab pack" integrated circuit unit or module 78, having a plurality of terminals 60 on either side thereof is readily plugged into the terminals 20, as indicated by the broken lines 80 in FIG. 6. The integrated circuit module is thereafter readily removed from the printed circuit board 52 by simply lifting up on it to remove the male terminals 60 from the female terminals 20, whereupon the integrated circuit module or a duplicate thereof may subsequently be reinstalled in the same manner as the original installation. As will be understood, such removal and reinstallation would be done in the event of failure of any part of the integrated circuit, or upon development of updated integrated circuits, or upon servicing of the printed circuit board or associated parts which might require heating thereof.

A modification of the invention is shown in FIGS. 7–11 for use with offset holes in a printed circuit board, the mounting tongues 128 being offset for this purpose. Certain of the parts in these figures are structurally or functionally similar to those heretofore shown and described, and for purposes of correlation and to avoid prolixity of numbers, similar numerals are used with the prefix 1. Attention should be directed first to FIGS. 8–10 for an understanding of the present form of the female terminal 120. The body 122 in the present instance comprises flat upper and lower sections with a tongue 222 extending down and in from the top section and spaced from the bottom section. The mounting tongue 128 is integral with the body 122 at the upper and lower sections thereof and is turned out at 90° therefrom. A sidewall 204 joins the body 122 at right angles thereto, having a vertically elongated section removed at 206 to facilitate bending of the sheet metal from the blank to form the right angle corners 208 and 210 between the body 122 and the sidewall 204.

The sidewall 204 is integrally joined at right angles by a rear wall 212 having an opening at 214 of the same vertical extent as the opening 206, whereby to facilitate formation of the right angle corners between the sidewall 204 and the rear wall 212. Similarly, there is a second sidewall 216 integral with the rear wall 212 at right angles thereto and parallel to the sidewall 204. The opening 214 facilitates forming the right angle corners between the rear wall 212 and the side wall 216. The side wall 216 terminates in a free edge 220 spaced from the body 122 to form a substantially closed, box-like structure. The entire upper periphery 218 is tipped out to facilitate reception of a male terminal.

The rear side 212 of the terminal is provided with a contact strip or tongue 222 extending downward and in from the upper portion of the rear wall 212 at 224, and then extending again back out obliquely at 226 to a free end 228 spaced from the lower portion of the rear wall 212. The tongue 222 is substantially a mirror image of the tongue 202.

Figures 7, 8, 9, 10, 11:
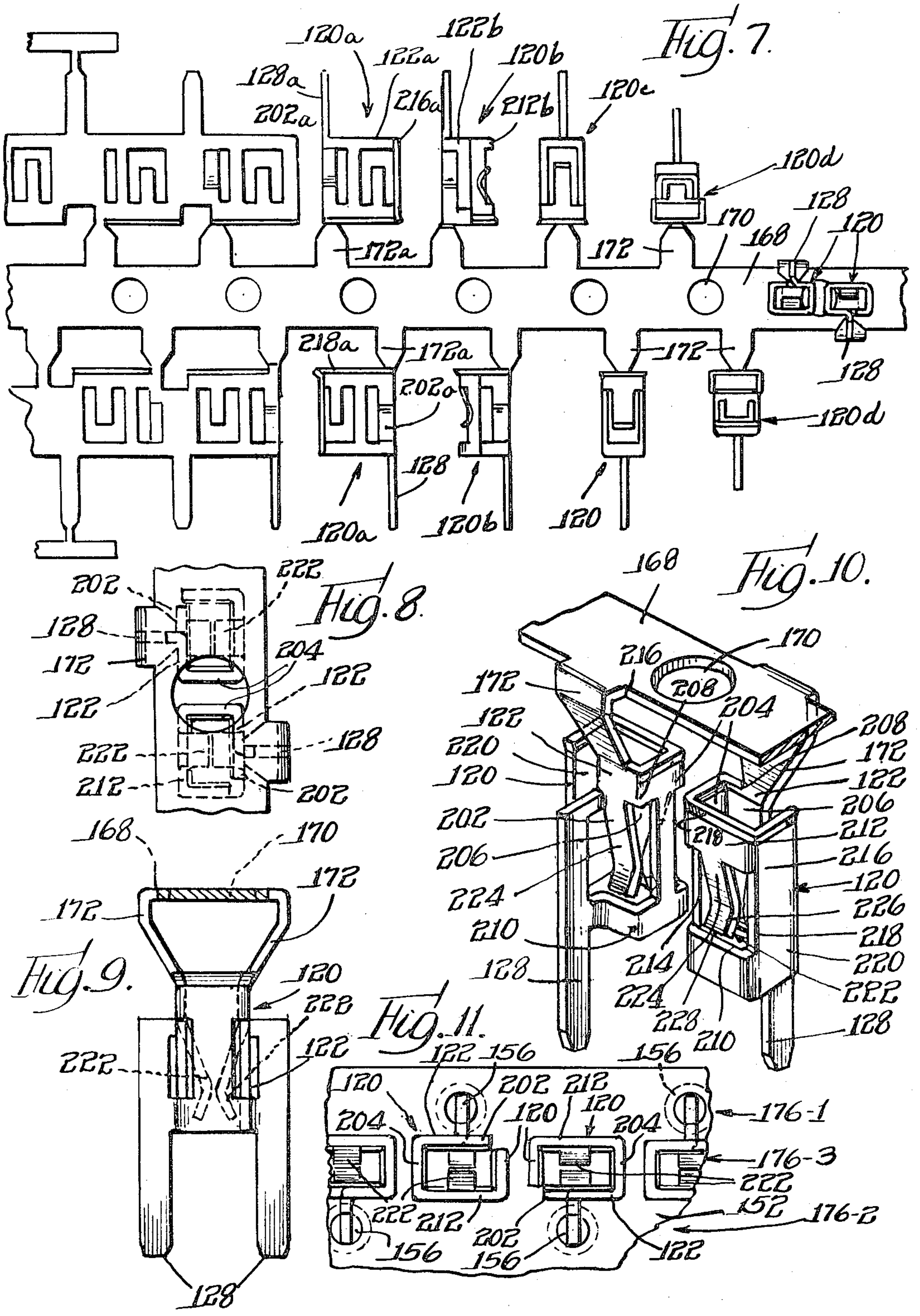
FIG. 7 is a view generally similar to FIG. 1 showing a modification of the invention for use with offset printed circuit board holes.
FIG. 8 is a fragmentary top view of a pair of terminals and interconnecting scrap piece in accordance with the enbodiment of FIG. 7.
FIG. 9 is an end view of the interconnected terminals as taken from the lower end of FIG. 8.
FIG. 10 is a perspective view of a pair of terminals in accordance with FIGS. 7–9.
FIG. 11 is a plan view of a fragment of a printed circuit board showing the terminals of FIGS. 7–10 plugged thereinto, the terminals being shown in cross-section.

As will be seen with continued attention to FIGS. 8–10, the scrap or carrier strip or band 168 lies in a horizontal plane with the connecting scrap tabs 172 extending down and diagonally in toward the centerline of the strip 168 whereby all of the terminals 120 lie in a straight line. However, since the terminals are alternatively reversed, the mounting tongues 128 are not aligned, but are spaced apart in two lines. Hence, with reference to FIG. 11, it will be seen that one "row" of holes 156 in a printed circuit board actually comprises two rows 176–1 and 176–2. When the terminals 120 held together by the carrier strip 168 have their alternately opposite tongues 128 inserted in the holes 156 of the rows 176–1 and 176–2 the bodies of the terminals 120 are aligned in one single row 176–3 intermediate the rows 176–1 and 176–2, whereby the bodies of the terminals may receive the male terminals of an integrated circuit of the "crab pack" variety as discussed heretofore.

As will be appreciated, the assembly of the groups of terminals with the printed circuit board 152 is the same as with the prior form of the invention, the terminals being supported by the carrier strip until they have been assembled with the printed circuit board by having their tongues 128 inserted through the holes and soldered to the printed circuit wiring on the printed circuit board.

Various steps in the formation of the terminals in automatic punch-press machinery are shown in FIG. 7, and initial blanking steps need not particularly be described. Reference should be had to about one third of the way from left to right of FIG. 7 where the final blank is formed, being indicated at 120*a*. At this point the tongue 128*a* has already been turned at right angles, and the second sidewall 216*a* has already been turned at right angles to the blank. Likewise, the contacting tongues 222*a* and 202*a* have been deformed from the plane of the blank. As will be apparent, two relatively reversed perspective terminals 120*a* are opposite one another, being attached to the carrier strip 168 by offset tabs 172*a*.

At the next station, the terminals 120*b* have further been formed, with the rear wall 212*b* having been turned at right angles to the plane of the body 122*b*.

The final turning at right angles has been effected at 120*c*, except that the body remains in the plane of the carrier strip 168. At 120*d* the terminal has been bent at an angle to the tab 172, and then in the final stage shown at the right the tab has been bent at an angle to the carrier strip whereby the terminal depends at right angles below the carrier strip.

Figure 14:
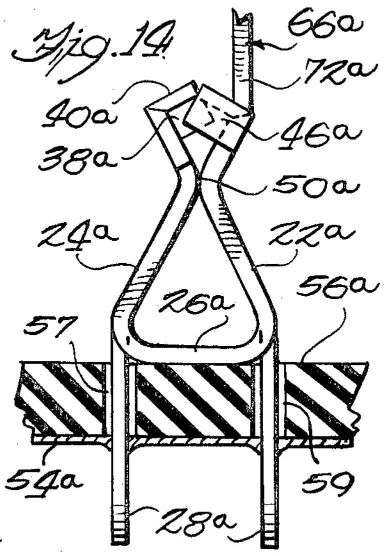
FIG. 14 is a side view seen from the right side of FIG. 12 but with the terminals shown attached to a printed circuit board.
Figures 13, 15:
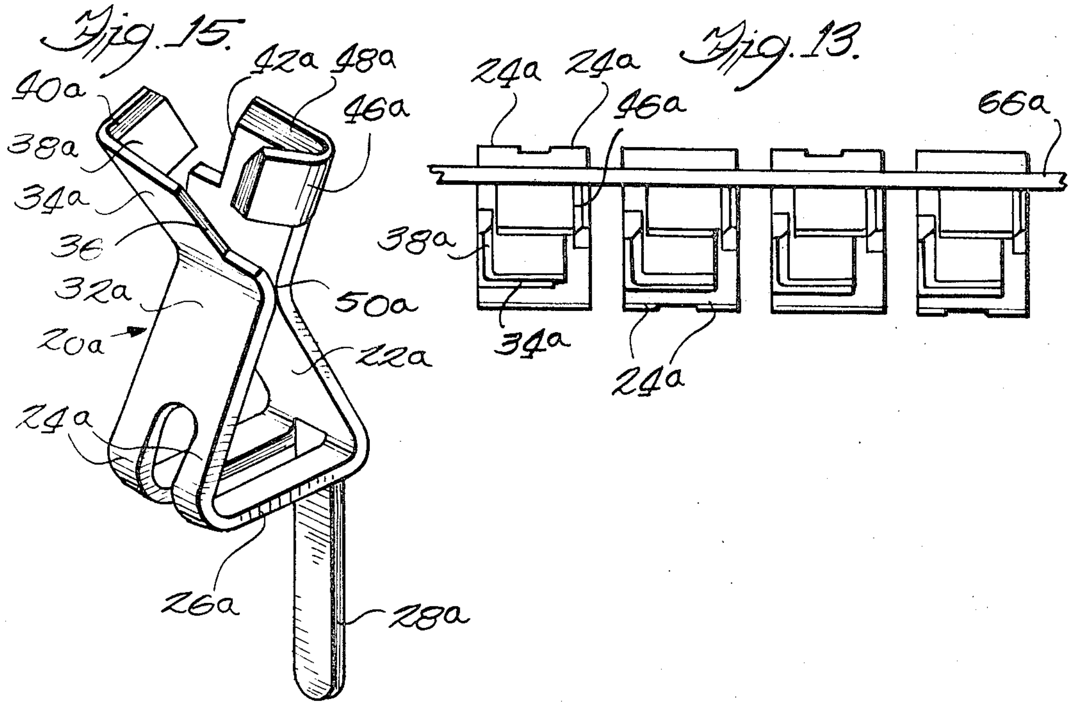
FIG. 13 is a front elevation as seen from the top of FIG. 12.
FIG. 15 is a perspective view of one of the terminals of FIGS. 12–14.

FIGS. 13–15 show a further modified form of the invention which is similar in many respects to the form of FIGS. 1–6. The terminal 220*a* includes a body 22*a* and an opposed somewhat flat resilient structure that includes spaced legs 24*a*, 24*a*. The legs are joined to the body by a base or bight 26*a* that is substantially flat but has end radii at the juncture of the bight and the legs, and at the juncture of the bight and the body 22*a*. The tongue or mounting member 28*a* is struck out of the material between the legs and extends downwardly from the body 22. As will be noted, the tongue 28*a* is at one end of the bight 26*a* in contrast to FIG. 2 wherein the tongue 28 is about centered relative to the bight 26. Thus, the tongue 28*a* is offset from the vertical center plane of the terminal, as viewed from FIG. 14, and is generally along a vertical side of the terminal and may be tangent to the radius that joins the bight 26*a* with the body 22*a.*

The upper end of the terminal 220*a* is similar in construction to the terminal 20, previously described. Thus, the parts in the FIGS. 12–15 followed by "*a*" designate parts that correspond to those of FIGS. 1–6 and are for the same purpose. Thus, the terminal 220*a* includes divergent flanges 34*a*, 42*a*, parallel lateral flange portions 38*a*, 46*a*, and notched-out portions 36*a*, 44*a*. However, in FIGS. 12–15 the throat 50*a* provides or may provide a closed restriction that will be separated when a male terminal 60 (FIG. 5) is inserted into the open upper end of the terminal 220*a* that is formed by the flanges 34*a*, 40*a*, 42*a*, 46*a*. Thus, as in the terminal 20, the aforesaid four flanges provide a locating arrangement to facilitate insertion of a male terminal into the female terminal 220*a.*

Figure 12:
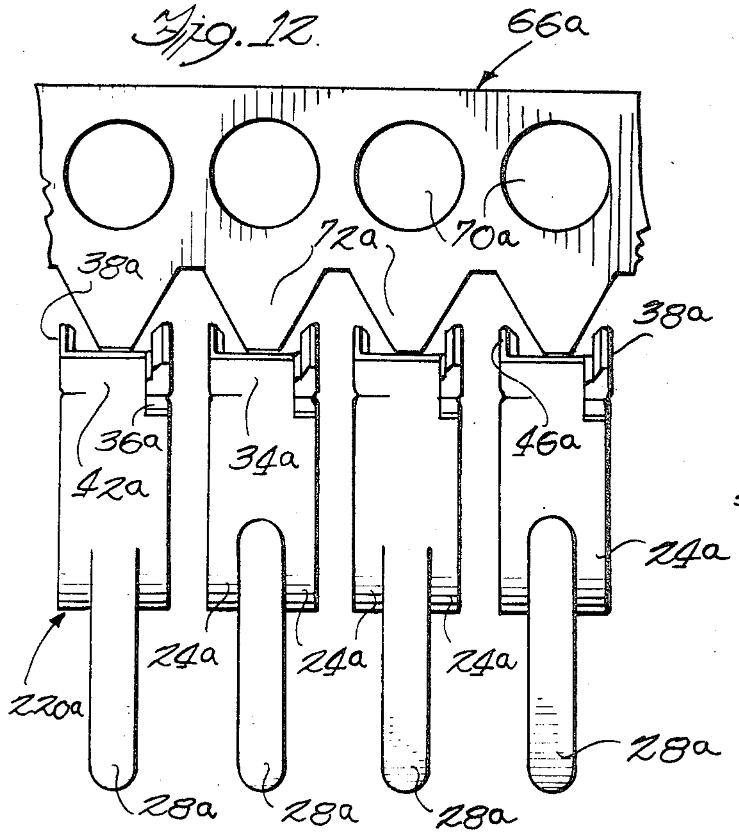
FIG. 12 is a plan view of a group of carrier strip connected terminals in accordance with a further form of the invention.

As seen in FIGS. 12–14, the group of terminals 220*a* are joined to a carrier strip 66*a* of sheet metal with holes 70*a* for driving the strip 66*a* through automatic machinery. In the completed stage of manufacture the terminals 220*a* are joined to the carrier strip by tabs 72*a* whereby the group of terminals 220*a* may be handled as a unit and mounted in a circuit board 56*a* (FIG. 14) having printed wiring 54*a*. The mounting tongues 28*a* of adjacent terminals 220*a* are oppositely disposed whereby alternate tongues are therefore in planar alignment. Consequently, the group of terminals 220*a* may be mounted in a circuit board 56*a* having two rows of holes 57, 59. The relatively flat bights 26*a* provide stable supports on the board for the respective terminals during mounting and subsequent soldering, and also in use when a "crab pack" is mounted in place. As in the previously described embodiments, the tongues 28*a* are soldered to the printed circuit wiring 54*a* at the holes 57, 59 following which the tabs 72*a* are severed where they join the terminals.

The terminals have been described as mounted in straight lines as required by "crab pack" integrated circuits. Other types of integrated circuits have terminals in other patterns such as circular, etc., and it will be understood that such arrays of female terminals are contemplated by the present invention.

The invention is claimed as follows:

1. A female terminal for detachable receipt of a male terminal comprising a body of resilient metal construction, an opposed resilient member integral with said body, said body and member converging toward their upper ends to provide a throat for gripping a male terminal, said body and member also having upwardly and outwardly diverging flanges extending from said throat and providing an upper end of said female terminal, a pair of spaced lateral flange portions at said upwardly and outwardly diverging flanges and extending generally transversely thereof, each said lateral flange portion being formed integral with one of said diverging flanges along an edge thereof and having a free end, thereby permitting said diverging flanges to move independently of each other upon the insertion of a male terminal therein, the lateral flange portions and the diverging flanges cooperating to provide a passageway converging toward the throat for receiving and guiding the male terminal into said throat with said spaced lateral flange portions defining the limits of lateral movement between said diverging flanges of said male terminal received in said passageway from a direction corresponding to the direction of convergence of said passageway, and depending mounting means for attaching said terminal to a circuit board.

2. A female terminal according to claim 1 in which said spaced lateral flanges are substantially parallel and are integrally joined to different ones of said diverging flanges at diagonally opposed edges thereof, so as to extend in opposite directions.

3. A female terminal for detachable receipt of a male terminal comprising a body of resilient metal construction, an opposed resilient member integral with said body, said body and member converging toward their upper ends to provide a throat for gripping a male terminal, said body and member also having upwardly and outwardly diverging flanges extending from said throat and providing an upper end of said terminal, spaced lateral flange portions at said upper end, the lateral flange portions and the diverging flanges cooperating to provide a passageway converging toward the throat for receiving the male terminal, and depending mounting means for attachment to a circuit board, said mounting means being a tongue that is struck at least in part from said opposed resilient member to provided spaced legs lying on opposite sides of said member.

4. A female terminal according to claim 3 in which said tongue lies substantially offset from the vertical center plane of the terminal.

5. A female terminal according to claim 3 in which said mounting member lies substantially within the vertical projection of the body and the opposed member.

6. A female terminal for detachable receipt of a male terminal comprising a body of resilient metal construction, an opposed resilient member integral with said body, said opposed member and said body being joined at their lower ends by a curved bight, said body and member converging toward their upper ends to provide a throat for gripping a male terminal, said body and member also having upwardly and outwardly directed flanges extending from said throat, each flange including a lateral flange portion at a side edge thereof and with the lateral flange portion of each flange projecting generally toward the opposite flange, said lateral flange portions overlapping when viewed from a side of said terminal, and a depending mounting member for attachment to a circuit board, said mounting member being integral with said body and being struck in part from said opposed member to provide in said opposed member a pair of spaced legs which lie on opposite sides of said mounting member.

7. A female terminal as set forth in claim 3 wherein said body and said member are connected by a bight that is substantially flat.

* * * * *